Nov. 27, 1951   G. E. WHITE   2,576,431
PRESSURE RELIEF SAFETY DEVICE
Filed Nov. 30, 1948
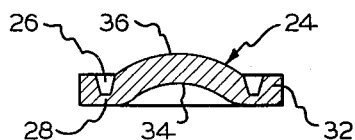
FIG. IV.
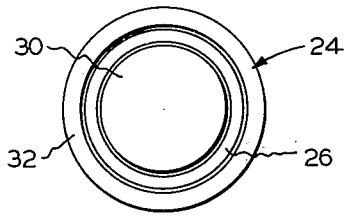
FIG. III.
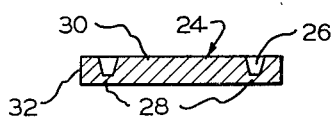
FIG. II.
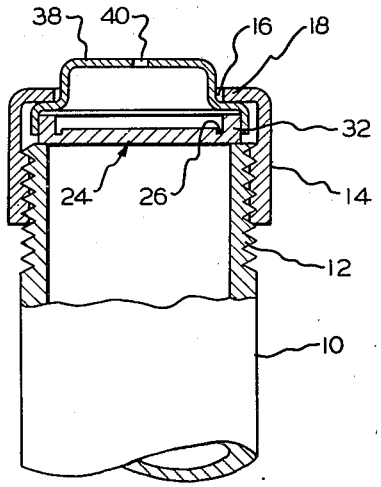
FIG. V.
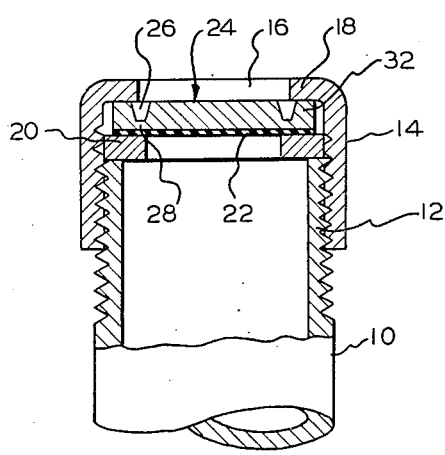
FIG. I.
Inventor
GERALD E. WHITE
By Beaman Patch Patented Nov. 27, 1951

2,576,431

UNITED STATES PATENT OFFICE 2,576,431

PRESSURE RELIEF SAFETY DEVICE

Gerald E. White, Middleville, Mich., assignor to White Products Corp., Middleville, Mich., a corporation of Michigan Application November 30, 1948, Serial No. 62,777

1 Claim. (Cl. 220—89)

This invention relates to a pressure relief safety device for use on tanks, pipes and vessels generally which are adapted to hold a pressure fluid and are required to be provided with an automatically actuated safety pressure operated relief device to prevent the occurrence of an excessive internal pressure.

The invention has for its object to provide a simple form of pressure relief device, which is easy to manufacture and install and which while normally offering a substantially immovable sealed closure upon a pressure vessel, pipe or like enclosing structure for water or other liquid or fluid under pressure, is capable of fracturing upon the occurrence of a certain pressure in the latter, which pressure is lower than the critical pressure of the vessel or pipe but higher than the working pressure.

The above and other objects and advantages of the invention will appear clear from a consideration of the following description with reference to the drawings in which:

Figure I is a longitudinal fragmentary sectional view of a pressure pipe fitted with a fracturable pressure relief device in accordance with the invention, Figure II is a cross-sectional view of the fracturable disc member seen in Figure I, Figure III is a plan view of Figure II, Figure IV is a similar view to Figure II but of a modified form of fracturable disc and Figure V is a similar view to Figure I but showing an alternative arrangement in which the fracturable disc member is employed in conjunction with an outer protective cap having a restricted central opening to reduce the flow of the pressure water or other fluid when the relief disc fractures.

Referring to the drawings, wherein like parts are given the same reference numeral, a pipe 10 having a screw-threaded end 12 and adapted to hold water or other working fluid under pressure, is shown fitted with an external nut 14 having a central opening 16 and an annular flange portion 18 between which, and the adjacent end of the pipe, there is clamped a hose washer 20, a protecting disc 22 and a fracturable pressure release disc or diaphragm indicated generally at 24.

The employment of the washer 20 and disc 22 is optional but the latter when employed serves to protect the relief disc 24 against the corrosive action of the pressure water or similar pressure medium, as when the relief disc 24 is made of aluminum.

The pressure relief disc 24 is made from a material having relatively low yield and elongation and which will fracture under pressure and its characteristic is such that it will fracture at a pressure which is lower than the critical pressure of the pipe 10 but higher than the required working pressure of the pressure fluid. This rupturing pressure is capable of being determined within very fine limits by a controlled grooving of the face of the disc as indicated at 26.

Although the invention is not limited to the formation of the disc 24 from any particular material and glass, plastic and die castings have been employed, very satisfactory results have been obtained with a disc 24 of aluminum.

Coining or otherwise forming disc 24 with a facial groove 26 in its exterior surface provides a weakened integral base portion 28 but leaves the disc with a relatively strong central portion 30 and peripheral rim 32 which are resistant to bowing and insures a clean break at the line of weakness constituted by the annular base portion 28 when fracture occurs.

In Figure IV, the pressure relief disc 24 is shown formed with its central portion dished so as to present an interior concave surface 34 and convex exterior surface 36.

In Figure V the pressure relief disc is shown employed in combination with an outer protecting cap 38 having a restricted opening 40 which reduces the liquid flow when the disc 24 fractures and also protects the latter from damage from the outside.

Having thus described my invention but without limitation to these precise details of construction what I claim as novel and wish to secure by Letters Patent is as follows:

In a pressure vessel having a pressure relief outlet conduit with an annular seat and a screw-threaded exterior portion, the combination of a pressure relief valve for said outlet conduit, said valve comprising a frangible disc member, a cap member and an annular interiorly screw-threaded nut engaged with said screw-threaded exterior portion, said cap member having a peripheral skirt with a radial flange defining a central hollow cap portion with an end wall having a restricted opening and an enlarged mouth portion open to said central cap portion, said frangible disc having a sliding fit in said cap mouth portion to normally close the cap at its mouth end and said annular nut having a radial flange fitting over said radial cap flange to hold the said cap secured upon the pressure outlet with the said frangible disc seated against annular seat, said restricted opening serving as a pressure relief opening upon fracture of said frangible disc.

GERALD E. WHITE.

REFERENCES CITED

The following references are of record in the file of this patent:

UNITED STATES PATENTS

| Number | Name | Date |
|---|---|---|
| 564,812 | Winne | July 28, 1896 |
| 1,579,141 | Pierce | Mar. 30, 1926 |
| 1,584,523 | Egbert | May 11, 1926 |
| 1,951,897 | Binckley | Mar. 20, 1934 |
| 1,959,822 | Greve | May 22, 1934 |
| 2,309,856 | Mason | Feb. 2, 1943 |
| 2,353,254 | McCandless | July 11, 1944 |